(12) United States Patent
Krikorian et al.

(10) Patent No.: US 11,759,715 B2
(45) Date of Patent: Sep. 19, 2023

(54) CONTAINING OPPONENTS IN AN ENCOUNTER SET IN A COMPETITIVE ENVIRONMENT

(71) Applicant: The Boeing Company, Chicago, IL (US)

(72) Inventors: Haig Francis Krikorian, Fullerton, CA (US); Leo Ho Chi Hui, Alhambra, CA (US)

(73) Assignee: THE BOEING COMPANY, Arlington, VA (US)

( * ) Notice: Subject to any disclaimer, the term of this patent is extended or adjusted under 35 U.S.C. 154(b) by 229 days.

(21) Appl. No.: 17/352,116

(22) Filed: Jun. 18, 2021

(65) Prior Publication Data

US 2022/0072432 A1    Mar. 10, 2022

Related U.S. Application Data

(60) Provisional application No. 63/062,727, filed on Aug. 7, 2020.

(51) Int. Cl.
*A63F 13/798* (2014.01)
*G06F 16/2457* (2019.01)

(52) U.S. Cl.
CPC ...... *A63F 13/798* (2014.09); *G06F 16/24578* (2019.01)

(58) Field of Classification Search
None
See application file for complete search history.

(56) References Cited

U.S. PATENT DOCUMENTS

| | | | |
|---|---|---|---|
| 9,443,433 B1 | 9/2016 | Conway et al. | |
| 9,786,178 B1 | 10/2017 | Bai et al. | |
| 2008/0033648 A1 | 2/2008 | Kelly et al. | |
| 2010/0042418 A1* | 2/2010 | Olsson | G06Q 10/06 705/1.1 |
| 2012/0005149 A1 | 1/2012 | Chen et al. | |
| 2015/0286219 A1 | 10/2015 | Reichel et al. | |
| 2020/0269136 A1 | 8/2020 | Gurumurthy et al. | |
| 2022/0044182 A1* | 2/2022 | Krikorian | G06Q 10/06398 |
| 2022/0051566 A1 | 2/2022 | Hui et al. | |

* cited by examiner

*Primary Examiner* — Ronald Laneau
(74) *Attorney, Agent, or Firm* — MH2 Technology Law Group LLP

(57) ABSTRACT

In one example aspect, a computer-implemented for managing containment behavior of a member during an encounter in a competitive environment includes: receiving, by a computing device, input data relating to the encounter within the competitive environment; determining, by the computing device, a reachable opponent set identifying one or more opponents reachable by the member; determining, by the computing device, containment boundaries for the member based on attributes of the member; determining, by the computing device, one or more containment options based on the containment boundaries and the reachable opponent set; generating, by the computing device, a containment instruction based on a particular one of the one or more containment options; and outputting, by the computing device, the containment instruction to cause the member to move to a position identified in the particular one of the one or more containment options.

17 Claims, 6 Drawing Sheets

CONTAINING OPPONENTS IN AN ENCOUNTER SET IN A COMPETITIVE ENVIRONMENT

CROSS-REFERENCE TO RELATED APPLICATIONS

This patent application claims priority to and the benefit of U.S. Provisional Application No. 63/062,727 filed on Aug. 7, 2020, the entirety of which is incorporated by reference herein.

STATEMENT REGARDING FEDERALLY SPONSORED RESEARCH OR DEVELOPMENT

This invention was made with Government support under Contract No. HQ0147-17-C-0001 awarded by The Missile Defense Agency. The Government has certain rights in this invention.

BACKGROUND

A competitive environment may include a team of members competing against a team of opponents. Managing the positioning and assignments of members of a team in a competitive environment may involve directing the members to move to a certain position (e.g., in a space in the competitive environment) and directing the members to perform an assigned task with the objective of neutralizing an opponent or achieving some other objective. Such management tasks may be applicable in a virtual/gaming environment, a sports environment, a combat environment (e.g., ground, air, and/or space environment), etc.

SUMMARY

In one example aspect, a computer-implemented for managing containment behavior of a member during an encounter in a competitive environment includes: receiving, by a computing device, input data relating to the encounter within the competitive environment; determining, by the computing device, a reachable opponent set identifying one or more opponents reachable by the member; determining, by the computing device, containment boundaries for the member based on attributes of the member; determining, by the computing device, one or more containment options based on the containment boundaries and the reachable opponent set; generating, by the computing device, a containment instruction based on a particular one of the one or more containment options; and outputting, by the computing device, the containment instruction to cause the member to move to a position identified in the particular one of the one or more containment options.

In another example aspect, a computer program product includes a computer readable storage medium having program instructions embodied therewith. The program instructions are executable by a computing device to cause the computing device to perform operations including: receiving input data relating to an encounter within a competitive environment; determining a reachable opponent set identifying one or more opponents reachable by the member; determining containment boundaries for a member involved in the encounter based on attributes of the member; determining one or more containment options based on the containment boundaries and the reachable opponent set; generating a containment instruction based on a particular one of the one or more containment options; and outputting the containment instruction to cause the member to move to a position identified in the particular one of the one or more containment options.

In another example aspect, a system includes a processor, a computer readable memory, a non-transitory computer readable storage medium associated with a computing device, and program instructions executable by the computing device to cause the computing device to perform operations including: receiving input data relating to an encounter within a competitive environment; determining a reachable opponent set identifying one or more opponents reachable by the member; determining containment boundaries for a member involved in the encounter based on attributes of the member; determining one or more containment options based on the containment boundaries and the reachable opponent set; generating a containment instruction based on a particular one of the one or more containment options; and outputting the containment instruction to cause the member to move to a position identified in the particular one of the one or more containment options.

DETAILED DESCRIPTION

Figure 1:
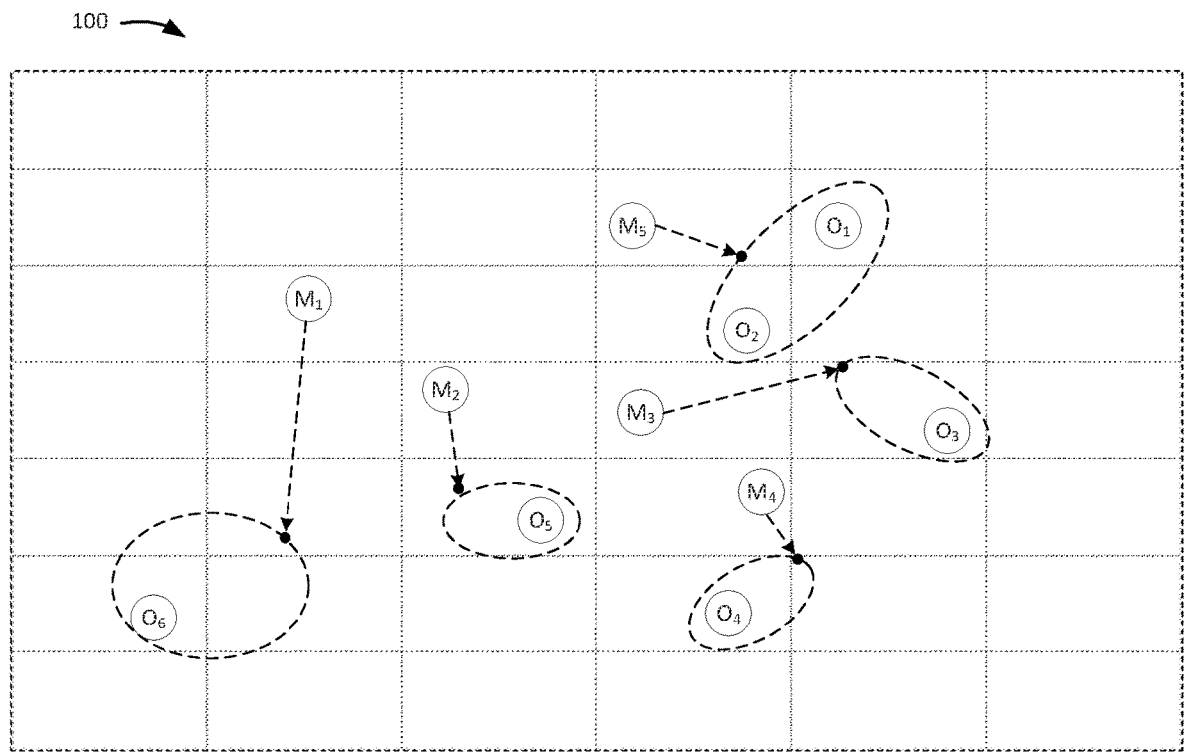
FIG. 1 illustrates an overview of an example implementation as described herein.

A competitive environment may include a team of members competing against a team of opponents. Managing the positioning and assignments of members of a team in a competitive environment may involve directing the members to move to a certain position (e.g., in a space in the competitive environment) and directing the members to perform an assigned task with the objective of neutralizing an opponent, defending an asset, and/or achieving some other objective. Complexities in an encounter between members and opponents may disrupt the management of members in a competitive environment. For example, input data and/or conditions for making management decisions may be distorted, or are not always reliable, clear, consistent, or obvious. As one example, opponents in the competitive environment may be intentionally deceitful, provide obstructions, hide information, behave erratically or unpredictably, with the objective of disrupting their opponent's abilities and chances to achieve their objectives. Other complexities in an encounter may exist, such as communication clarity issues, numeric advantages/disadvantages, member positioning, member priorities, etc. The presence of such complexities may lead to hasty decisions resulting in incorrect or sub-optimal member placement and task assignments, poor team resource management, inflexibility, etc.

Accordingly, aspects of the present disclosure may include a system and/or method to develop a consensus plan (e.g., a strategy) to direct the placement of members in a complex, noisy, competitive environment against deliberately deceptive opponents. More specifically, aspects of the present disclosure may include a central management device used to develop a placement strategy and control the placement of members for containing the threat of opponents based on a leader-follower derivative multi-agent (e.g., multi-member) containment system. In some embodiments, aspects of the present disclosure may also accommodate a complex competitive environment in which communications between members and the central management device may be subject to random signal drop-outs.

As described herein, the systems and/or methods may develop a containment plan in which "containment" refers to the positioning of members in a competitive environment to maximize an ability to engage (e.g., reach) the opponents and/or disrupting or preventing the opponents from achieving an objective (e.g., neutralizing a friendly asset, advancing or moving beyond a containment area, etc.) as well as positioning members in such a way that maximizes the members' options to assist with engaging other opponents. By maximizing the collective reach by all members in a team, the systems and/or methods may maximize the integrated observation time across the members to allow additional processing time for resolving, settling, and properly interpreting deceptive opponent behavior (e.g., opponent movements, placements, attributes, etc.).

As described herein, the use of reach positioning may provide a predictive quality to the overall containment strategy, which may be used to predict fuel/resource margins and optimize containment based on resource availability and/or efficiency. As described herein, to establish reach, relative position velocity and acceleration may be factored in in addition to positioning. In some embodiments, a "time-to-go" (e.g., an amount of time for a member to reach an opponent) may be determined and used as an input variable for determining reach. For example, the time-to-go value may provide a balanced coordinated consensus containment such that members are not prematurely committed to opponents too early, leading to a reduction in engagement options. The combination of actions, described herein, may be used to determine final member placement and assignment of members for containing high value opponents (HVOs) with low uncertainty within expendable resource margins.

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Embodiments of the disclosure may include a system, a method, and/or a computer program product at any possible technical detail level of integration. The computer program product may include a computer readable storage medium (or media) having computer readable program instructions thereon for causing a processor to carry out aspects of the present disclosure.

FIG. 1 illustrates an overview of an example implementation in accordance with aspects of the present disclosure. As shown in FIG. 1, a competitive environment 100 may be electronically and graphically represented in the form of a grid of an area. The competitive environment 100 may include members of a team or group (represented by points or icons labeled as "$M_1$" through "$M_5$") and opponents of an opposing team or group (represented by points or icons labeled as "$O_1$" through "$O_6$") that may be engaged in an encounter (e.g., a real-time or preplanned encounter). It is noted that the example competitive environment 100 shown in FIG. 1 is provided for illustrative purposes only. In practice, the boundary size/shape of the competitive environment 100 and the quantity and position of members and opponents may vary.

In some embodiments, the competitive environment 100 may be a virtual/gaming environment, a sporting environment, a combat environment (e.g., ground, air, and/or space environment), etc. Generally, a member may represent any entity (e.g., asset, individual, component, vehicle, etc.) associated with one team or group, and an opponent may represent any opposing entity associated with an opposing team or group. As one illustrative, non-limiting example, the competitive environment 100 is a space environment in which the members may be space vehicles or space assets associated with one team or group, and the opponents may be adversary space vehicles or assets associated with adversary team or group.

In some embodiments, aspects of the present disclosure may include determining the strategic movement/placement of members in the competitive environment 100 for an encounter with respect to the opponents, as well as the strategic assignment of tasks for each member to achieve a particular objective or group of objectives (e.g., objectives to contain and/or neutralize threats and/or assets from the opponents, objectives to defend one or more assets, etc.). More specifically, the systems and/or methods, described herein, may determine a containment strategy for best containing opponents by members in a team set in the competitive environment 100.

As shown in FIG. 1, the planned movements of each member and their containment areas may be graphically represented in arrows as shown. Also, in some embodiments, the graphic representation of the competitive environment 100 may also identify the movement predictions of the opponents. In some embodiments, the containment of an opponent may involve the positioning of members in a competitive environment to maximize an ability to engage (e.g., reach) the opponents, disrupting and/or preventing the opponents from achieving an objective (e.g., neutralizing a friendly asset, advancing or moving beyond a containment area, etc.), as well as positioning members in such a way that maximizes the members' options to assist with engaging other opponents.

As described herein, the approach for placement of members during an encounter is consistent with a "prudent and aggressive" overall encounter engagement approach in which the members are placed in a manner that avoids hasty decisions, and thus does not overcommit the members' time and resources, while leaving the members in a position to quickly shift or adjust their positions and assignments as the encounter continues over time and as more information is available over time. Further, the approach for placement of members may be such that threats from opponents may be contained (e.g., preventing opponents from advancing beyond a containment area) to allow additional time to pass to gather additional data, resolve and properly interpret deceptive and/or noisy data, etc. Thus, as additional data is gathered and more information is gleaned as the encounter continues, subsequent placement decisions may be made from a more complete set of information. Further, as more complete information is gathered, the more aggressive the approach may be for containing and/or neutralizing opposing threats and assets.

As further shown in FIG. 1, and in the spirit of taking a "prudent and aggressive" approach, movements of the members may be such that instead of members quickly and aggressively moving in a direct path to opponents, the movements may be initially more gradual so as to provide general containment of the threat of the opponents (e.g., contain the opponents' movements within a containment area). For example, with consideration to member $M_1$, as shown in FIG. 1, the movement of $M_1$ may be planned such that $M_1$ approaches a vicinity of $O_6$ in order for $M_1$ to contain $O_6$. In this way, $M_1$ is still in a position to assist with the servicing or engagement of $O_5$, as shown. Other members may be positioned in a similar manner so as to maximize containment of the opponents until additional information is gathered. Further, when a team is at a numerical disadvantage, the systems and/or methods, described herein, may assist the team to overcome this disadvantage. In the example shown in FIG. 1, five members may be facing six opponents, but using the approach described herein, all six opponents may be contained by the five members.

As described in further detail herein, the movement assignments of members for containment may be based on a variety of factors with consideration to the presence of complexities. For example, different members may have different containment capabilities (e.g., area sizes that they may be able to contain), fuel levels, maneuverability capabilities, etc. Further, the attributes, positions, and/or movements of opponents may not be immediately or clearly determined. For example, opponents may take deceptive or unpredictable actions, take measures to hide their identities, or take any other variety of actions to confuse and/or disrupt the members. Accordingly, the containment approach, described herein, may result in members initially taking slower, more cautious positions such that threats from opponents may be contained, while allowing additional time to pass for deceptive, noisy, and/or incomplete data to be properly interpreted.

Figure 2A:
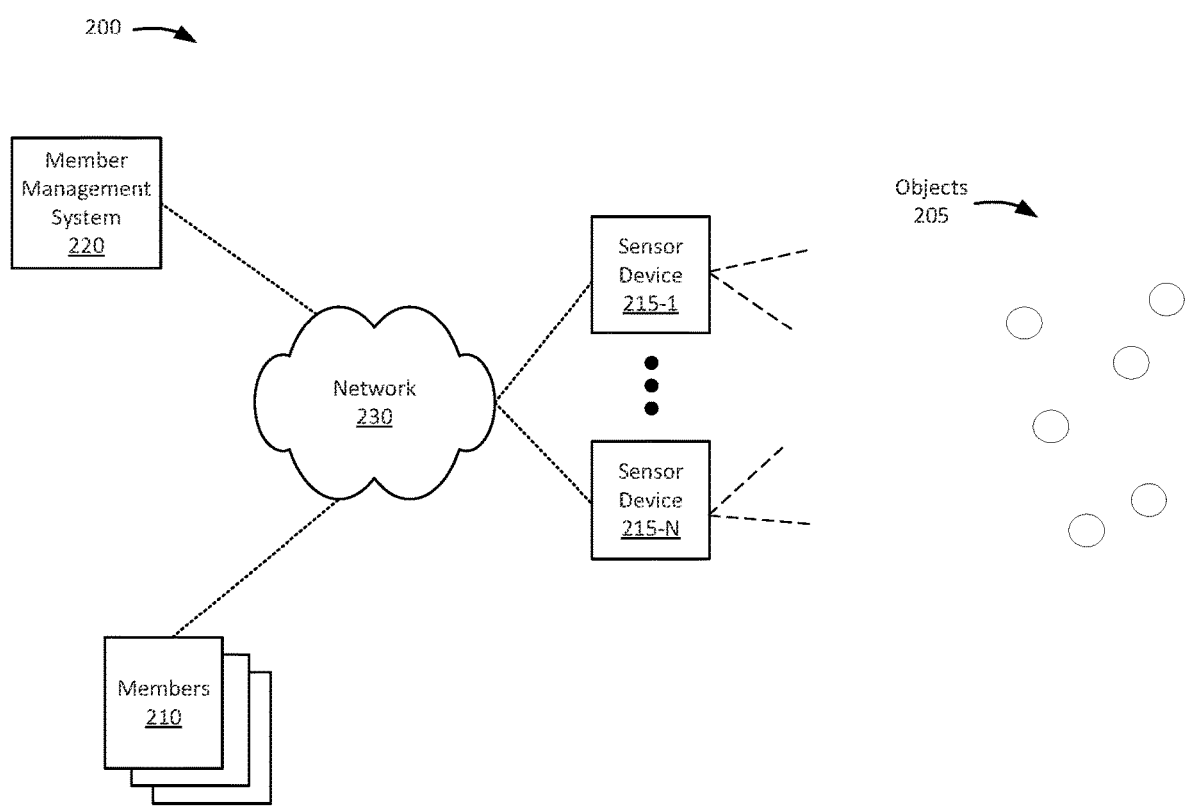
FIGS. 2A and 2B illustrate an example environment as described herein.
Figure 2B:
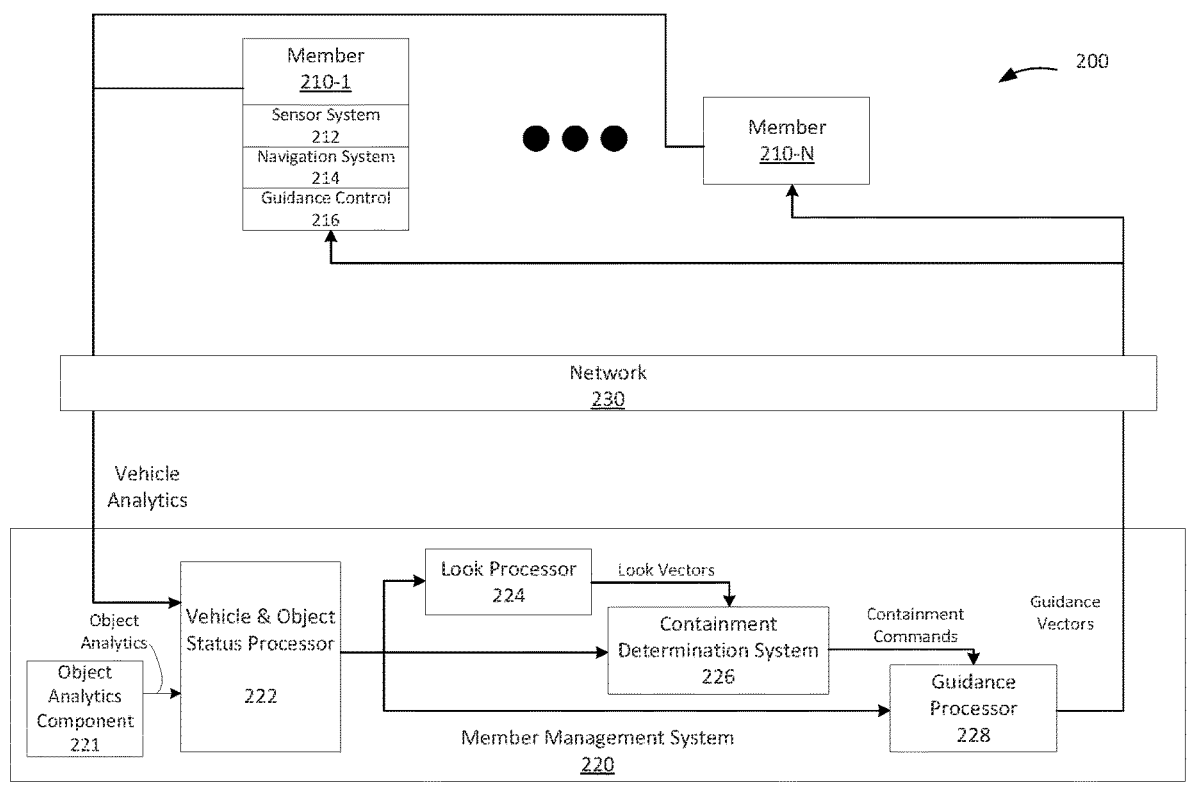

FIGS. 2A and 2B illustrate an example environment in accordance with aspects of the present disclosure. As shown in FIG. 2A, the environment 200 includes members 210, sensor devices 215 (e.g., sensor devices 215-1 through 215-N), a member management system 220, and a network 230.

The members 210 may include any variety of assets, vehicles (e.g., ground vehicles, spacecraft, aircraft, etc.), objects, etc. that are part of a team in a competitive environment. As one illustrative example, members 210 may be space vehicles. Additionally, or alternatively, members 210 may be any variety of virtual objects, characters, etc. in a virtual environment (e.g., virtual combat environment, virtual gaming environment, etc.).

The sensor devices 215 may include object sensor devices that may be distributed over an area for detecting objects 205 and their attributes (e.g., potential opponents or adversaries). In some embodiments, the sensor devices 215 may be implemented as part of friendly members 210 and/or as stand-alone devices. In some embodiments, the sensor devices 215 may gather raw data representing object emission properties, movement, etc. Each sensor device 215 may report, to the member management system 220, a "belief" or estimation of the object's attributes and/or identity based on the collected raw data (e.g., using any suitable combination of object prediction algorithms). In some embodiments, a reported belief may include a confidence level of the object's attributes. The confidence reported by each sensor device 215 may increase over a period of time as additional data is gathered until a belief is stabilized.

As described herein, multiple different sensor devices 215 may report divergent beliefs regarding an object's attributes as a result of environmental noise, sensor design preferences for detecting certain emission properties, various scan rates, different object viewpoints and sensor positions, etc. Accordingly, the member management system 220 may implement techniques to establish a consensus belief of the object's attributes. For example, the member management system 220 may establish a belief by implementing a "stable reasoner" approach that considers the beliefs of each of the sensor devices 110, even outliers. Further, the member management system 220 may determine a cause of unstable reportings from the sensor devices 215, and in turn, determine whether conclusions made by sensor devices 215 with unstable reportings should be believed.

The member management system 220 may include one or more computing devices that monitors the state of an encounter as the encounter unfolds, generates a containment plan, and generates instructions to control the movement of members based on the containment plan. In some embodiments, the member management system 220 may generate the containment plan based on any variety of member information. Using space vehicles as an example, the member attributes may include vehicle capabilities/kinematics, types, dimensions, functions, fuel levels, fuel consumption behaviors, vehicle health/status, etc. In some embodiments, the member information may be received from the members 210 (e.g., directly or via another device that monitors and disseminates the member information of the members 210).

The member management system 220 may further generate a containment plan based on opponent attributes, opponent movement estimates, etc. In some embodiments, the member management system 220 may communicate with the sensor devices 215 to obtain information that may be used to derive opponent position and/or attributes. The member management system 220 may further receive input data from members 210 and/or any other "friendly" sources (e.g., sensors, observation systems, etc.). The member management system 220 may prepare the input data to generate a representation of a current state of a competitive environment (e.g., the current position and assignment of members 210, attributes of the members 210, position and attributes of opponents, etc.). As described herein, data regarding an opponent may be noisy, incomplete, and deceptive. As such, in some embodiments, the member management system 220 may fuse conflicting, noisy, and/or incomplete data to generate a "belief" or most likely estimate of the attributes and position of opponents.

In some embodiments, the member management system 220 may generate containment options for a member 210 by receiving and preparing inputs of the competitive environment, identifying opponents (and their attributes/movements) in the competitive environment from the inputs, ranking the opponents based on their levels of importance (e.g., impact capability), selecting a subset of the highest ranked opponents, determining a reachable opponent set, determining a centroid of reachability for the reachable opponent set, and determining correction limits. As described herein, the member management system 220 may centralize the control of members 210 and/or centrally manage member 210 placement information. In this way, the member management system 220 may coordinate the execution of a containment plan among the members 210.

The network 230 may include network nodes and one or more wired and/or wireless networks. For example, the network 230 may include a cellular network (e.g., a second generation (2G) network, a third generation (3G) network, a fourth generation (4G) network, a fifth generation (2G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

FIG. 2B represents a more detailed view of components and dataflows within the environment 200. Referring to FIG. 2B, each member 210 may include a sensor system 212, a navigation system 214, a guidance control 216, and/or other computing and propulsion components for supporting the operations, guidance, navigation, and/or movement of the member 210. In an example in which the member 210 is a spacecraft, the sensor system 212 may include object detection sensors, motion sensors, temperature sensors, fuel level sensors, vehicle operation sensors, and/or any other variety of sensors. The sensor system 212 may include and/or correspond to the sensors 215 shown in FIG. 2A. The navigation system 214 may include one or more computing devices that provides navigation services for the member 210, and may track the actual and planned route, path, and/or trajectory of the member 210. In some embodiments, the navigation system 214 may track vehicle movement information, such as the speed, acceleration, position, etc. The guidance control 216 may include one or more computing devices that controls and/or guides the trajectory of the member 210. In some embodiments, each member 210 may communicate with the centralized member management system 220 for centralized coordinated control of the members 210 in connection with the development and/or execution of a containment plan. As described herein, each member 210 may provide vehicle analytics data to the centralized member management system 220. Example vehicle analytics data may include sensor readings, speed, acceleration, position, actual and planned trajectory, vehicle specifications (e.g., vehicle type, vehicle size, maneuverability capabilities, technical specifications, etc.), or the like.

The centralized member management system 220 may include one or more computing devices that may centralize the operations, control, and/or analytics data of vehicles. Further, the centralized member management system 220 may monitor vehicle and object analytics data as part of developing and/or executing a containment plan. In some embodiments, the centralized member management system 220 may be implemented in a member 210. Additionally, or alternatively, the centralized member management system 220 may be a ground-based unit, or a distributed group of ground-based systems, servers, and computing devices. As further shown in FIG. 2B, the centralized member management system 220 may include an object analytics component 221, a vehicle and object status processor 222, a look processor 224, a containment determination system 226, and a guidance processor 228.

The object analytics component 221 may detect the presence of objects within a vicinity of the members 210. As described herein, an object may include a vehicle not connected to the centralized member management system 220, a stationary object, an airborne object, a celestial object, or the like. In some embodiments, the object analytics component 221 may acquire analytics data associated with an object, such as the object's shape/dimensions, object's image, object type, velocity, acceleration, travel path, etc.

The vehicle and object status processor 222 may include one or more computing devices that ingests the vehicle analytics and the object analytics, and provides all or a portion of the vehicle and/or object analytics data to the look processor 224, the containment determination system 226, and/or the guidance processor 228. In some embodiments, the vehicle and object status processor 222 may process, modify, prune, trim, and/or filter the vehicle analytics and/or the object analytics.

The look processor 224 may include one or more computing devices that identifies a field of view of a member 210 in relation to its propulsion system (e.g., the field of view of sensors implemented on the member 210). The look processor 224 may provide look vectors to the containment determination system 226 in which the look vectors indicate to the containment determination system 226 the direction and position in which sensor readings are associated. The look vectors allow the containment determination system 226 to more accurately interpret and processor the sensor readings.

The containment determination system 226 may include one or more computing devices that receives the look vectors (e.g., from the look processor 224), the processed vehicle analytics data, and/or the processed object analytics data (e.g., from the vehicle and object status processor 222). The containment determination system 226 may monitor the received data and support the development and/or execution of a containment plan (e.g., based on the forecasted trajectories, velocities, accelerations, and/or other variety of factors). In some embodiments, the containment determination system 226 may generate a set of containment options and output containment commands which the guidance processor 228 may convert into guidance vectors (e.g., for guiding the members 210 in accordance with a containment plan). In some embodiments, the guidance processor 228 may output the guidance vectors to a member 210, and the member 210 may convert the guidance vectors into propulsion system commands that, when executed, alter the trajectory of the members 210-1 to move to an area for containment of one or more opponents.

The quantity of devices and/or networks in the environment 200 is not limited to what is shown in FIGS. 2A and 2B. In practice, the environment 200 may include additional devices and/or networks; fewer devices and/or networks; different devices and/or networks; or differently arranged devices and/or networks than illustrated in FIGS. 2A and 2B. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3A:
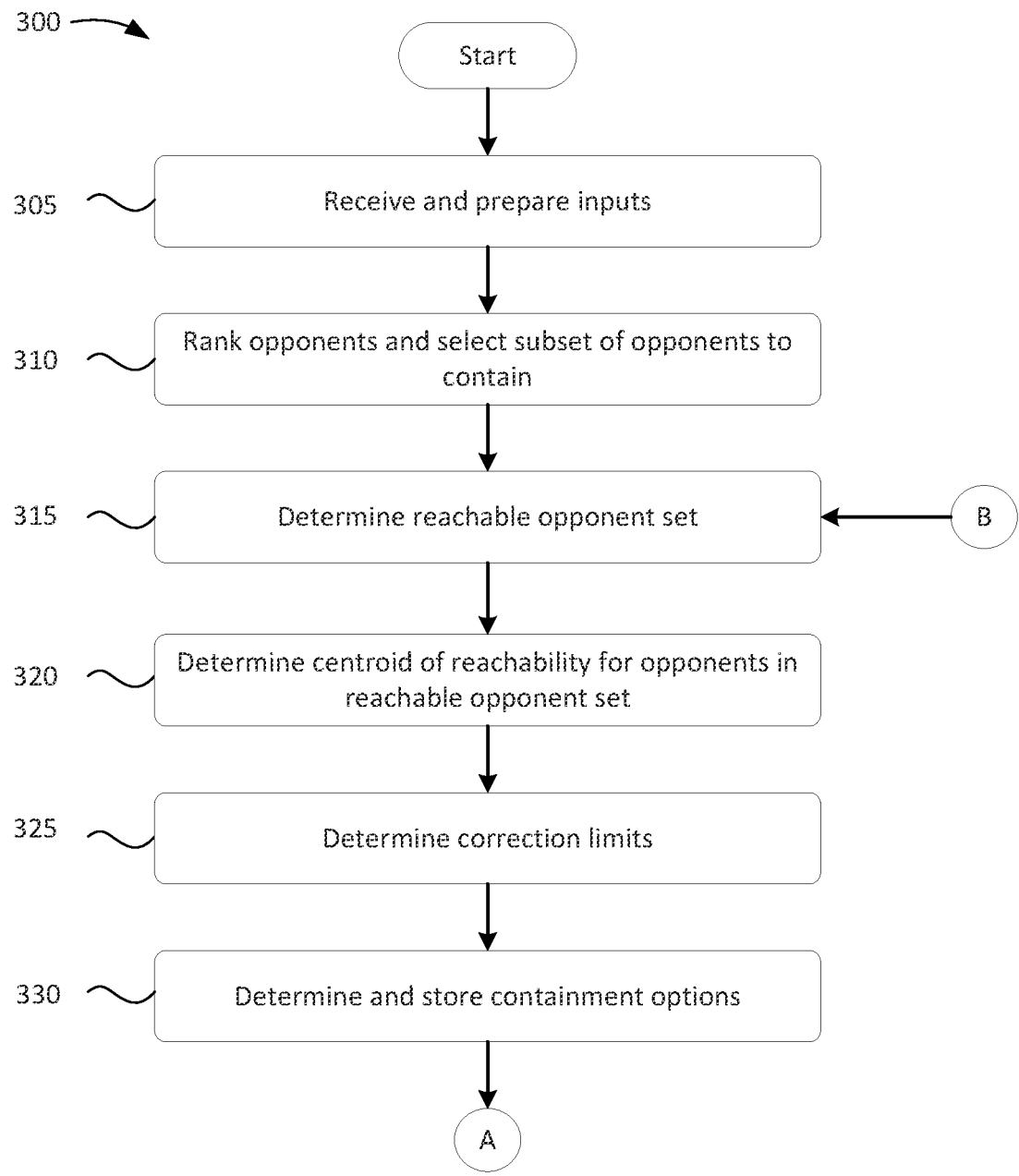
FIGS. 3A and 3B illustrate an example flowchart of a process for generating and executing a containment plan for members of a team for containing opponents in a competitive environment as described herein.
Figure 3B:
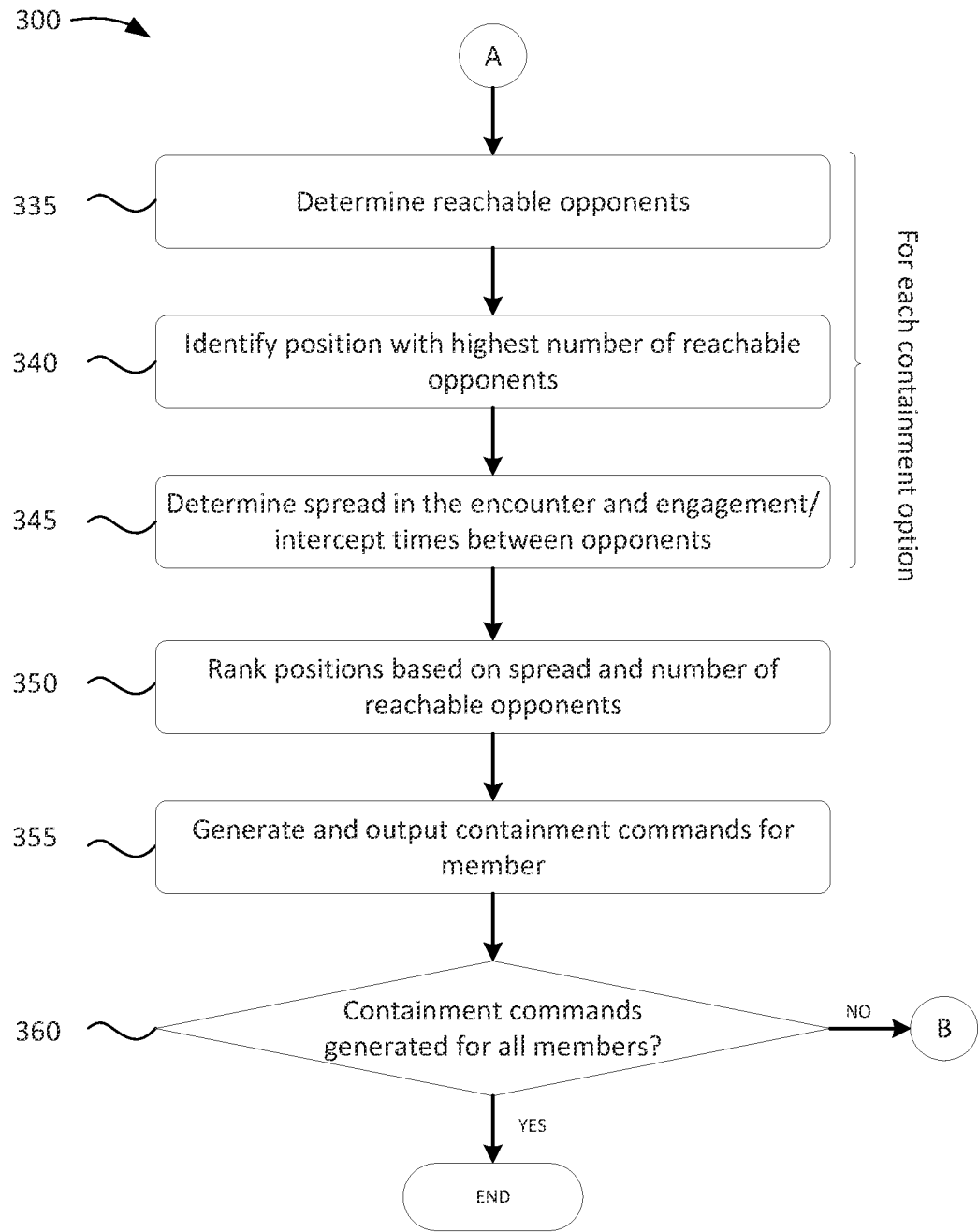

FIGS. 3A and 3B illustrate an example flowchart of a process for generating and executing a containment plan for members of a team for containing opponents in a competitive environment. The blocks of FIGS. 3A and 3B may be implemented in the environment of FIGS. 2A and 2B, for example, and are described using reference numbers of elements depicted in FIGS. 2A and 2B. As noted herein, the flowchart illustrates the architecture, functionality, and operation of possible implementations of systems, methods, and computer program products according to various embodiments of the present disclosure.

As described herein, one or more blocks of process 300 may be used to determine a set of containment instructions for a member 210. Thus, one or more blocks of process 300 may be repeated to determine multiple sets of containment instructions for multiple different members 210 in a team engaged in an encounter in a competitive environment.

As shown in FIG. 3A, the process 300 may include receiving and preparing inputs (block 305). For example, the member management system 220 may receive and prepare input data received from any variety of input sources (e.g., members 210, sensors 215, friendly data sources, etc.). In some embodiments, preparing the input data may involve identifying the attributes, positions, predicted movements, and predicted intents of opponents in a competitive environment. As described herein, opponent behavior may not be clear or obvious and may be intentionally deceptive. Thus, different input sources may report different or conflicting beliefs for the opponents' information (e.g., the opponents' attributes, movements, intended movements, etc.). Accordingly, the member management system 210 may smooth and fuse conflicting belief data from different input sources. Further, any variety of data fusion and/or smoothing techniques may be used. As one illustrative, non-limiting example, the member management system 210 may fuse belief data from multiple sources using Covariance Intersection (CI). In some embodiments, the CI output may be fused with belief data from an additional data source (e.g., an additional sensor device 215 or member 210), again using CI. This second CI output may be fused with sensor belief data from an additional data source using CI, and so on and so forth. As further described herein, the member management system 210 may apply a Kalman Filter after fusing the data to further stabilize the data and improve belief accuracy. In this way, the member management system 210 may converge towards a belief that considers all of the beliefs reported by data sources, without merely settling on an average of the data or a majority. In some embodiments, preparing the input data may include determining measures of values of opponents based on their attributes and/or intents as determined by fusing beliefs from multiple sources.

In some embodiments, preparation of the input data and propagation of the input data to the next expected move update time may include generating a representation of a competitive environment in which the representation identifies member 210 information (e.g., member 210 position, attributes, etc.) and opponent information (e.g., opponent position, attributes, etc.). In some embodiments, the representation of the competitive environment may be graphically represented (e.g., in a manner similar to FIG. 1). In some embodiments, the input data may include a node, or a data file containing information identifying a current state of the encounter and the competitive environment.

The process 300 also may include ranking opponents and selecting a subset of opponents to contain (block 310). For example, the member management system 220 may rank the opponents based on their measures of values (e.g., as determined when preparing the inputs at block 305). In some embodiments, a subset of opponents may be selected based on the opponent ranks and based on resource levels, capabilities, etc. of the member 210. For example, opponents having measures of values satisfying a threshold may be selected.

The process 300 further may include determining a reachable opponent set (block 315). For example, the member management system 220 may determine a set of opponents that are reachable to the member 210 (e.g., a reachable opponent set). In some embodiments, "reachability" by the member 210 may be based on resource/fuel levels of the member 210 and the amount of resources needed to reach a containment point for the opponent. Additionally, or alternatively, reachability may be based on kinematics of the member 210, speed capabilities, status/health of the member 210, resolution capability of the member 210 (e.g., the ability to resolve kinematically close opponents), etc.

The process 300 also may include determining a centroid of reachability for each member for the opponents in the reachable opponent set (block 320). For example, the member management system 220 may determine a centroid of reachability for each member for the opponents in the reachable opponent set. More specifically, the member management system 220 may compute a centroid of the delta Vs to the opponents in the reachable opponent set for each member. This calculation may form the basis for individual containment "grid" options. In some embodiments, the centroid of reachability may be based on a weighted opponent importance or opponent value (e.g., as determined as part of preparing the inputs at block 305). Additionally, or alternatively, the centroid of reachability may be based on estimated times to reach/intercept opponents, fuel consumptions limits of the member 210, estimates of opponents' movements (e.g., trajectory and acceleration). In some embodiments, the centroid of reachability may include a center of one or more of the aforementioned estimates. That is key, the centroid of reachability may be based on a reachability rather than a space centroid.

The process 300 further may include determining correction limits (block 325). For example, the member management system 220 may determine correction limits, such as the limits or constraints of the member 210 to adjust or make corrections to positions when containing opponents. In some embodiments, determining the correction limits may include determining the minimum and maximum boundaries for a containment grid or area that the member 210 may cover. More specifically, the correction limits may identify the minimum amount of fuel needed for the member 210 to reach opponents and the maximum distance or area the member 210 may cover based on fuel limits and/or fuel consumption behavior. In some embodiments, maneuverability and/or other capabilities of the member 210 may be considered and factored when determining the correction limits. That is, the correction limits or containment boundaries may be based on the attributes of the member 210 (e.g., on fuel limits, fuel levels, and/or fuel consumption behavior, maneuverability, capabilities, etc.)

The process 300 also may include determining and storing containment options (block 330). For example, the member management system 220 may determine and storing containment options based on the determined corrections limits (e.g., boundaries for a grid determined at block 325). In some embodiments, each containment option may encompass one or more of the reachable opponents in the reachable opponent set (e.g., as determined at block 315). Additionally, or alternatively, the containment options may be based on the centroid of reachability (e.g., as determined at block 320). For example, the containment options may be developed based on centroid of reachability satisfying thresholds (e.g., time to intercept thresholds, fuel consumption limits, opponent estimated trajectories, etc.).

In some embodiments, the member management system 220 may develop a grid of containment options in which each option establishes the member's 210 next possible containment directives and include the differential gas expenditures against current directives for the member 210.

Each containment options may identify a measure a cost/benefit of each option with respect to fuel consumption cost and benefit of containing opponents (e.g., based on measures of opponent values). In some embodiments, each containment option identifies a "board position" on the grid to which the member 210 may move, and the containment area the member 210 may cover based on fuel levels, maneuverability capabilities, etc. In some embodiments, the containment options may be laid out or represented in a grid, in a non-linear spread, centered around the member's current directives. FIG. 1 illustrates one illustrative example of containment options for five members in a competitive environment having six opponents.

Referring to FIG. 3A, the process 300 further may include determining reachable opponents (block 335). For example, for a particular containment option, the member management system 220 may determine which opponents are reachable (e.g., if the member 210 were to relocate to a position defined by the particular containment option). In some embodiments, the member management system 220 may determine a time to intercept each opponent and incremental fuel expenditures to identify that set of opponents that can be reached within margin from the particular containment option by the member 210. Block 335 may be repeated for each containment option such that the reachable opponents for each containment option may be determined.

The process 300 also may include identifying position with highest number of reachable opponents (block 340). For example, the member management system 220 may identify which position (e.g., which containment option) has the highest number of reachable opponents (e.g., based on the number of reachable opponents for reach containment option determined at block 340).

The process 300 further may include determining the spread in the encounter and the engagement/intercept times between the opponents (block 345). For example, for each containment option, the member management system 220 may determine these encounter/engagement/intercept times between the member 210 and the reachable opponents (e.g., the time to intercept each opponent).

The process 300 also may include ranking the positions based on the above spread times and number of reachable opponents (block 350). For example, the member management system 220 may rank the positions (e.g., containment options) based on the spread times mentioned (determined at block 345) and the number of reachable opponents (e.g., determined at block 335). In some embodiments, spread of fuel margins or spread of reachability may be used as an alternative or as additions to the use of the above spread times. In some embodiments, the member management system 220 may generate scores and/or apply weights as part of the ranking of the containment options, and may weigh the reachability and intercept times of higher value opponents more heavily than lower value opponents. In some embodiments, the member management system 220 may output information identifying the containment options and their ranks.

The process 300 further may include generating and outputting containment commands for the member (block 355). For example, the member management system 220 may generate and output containment commands for the member to instruct the member to execute a particular selected containment option. In some embodiments, the member management system 220 may automatically select the highest ranked containment option and generate commands based on the selected highest ranked containment option. Additionally, or alternatively, the member management system 220 may receive a selection for a containment option (e.g., from an operator) in which the selection may be based on the outputting information identifying the containment options and their ranks from block 350. In some embodiments, the member management system 220 may output the commands to the member via the guidance processor 228 which may generate guidance vectors that instruct the member 210 to move to a position corresponding to the selected containment option.

The process 300 also may include determining whether containment commands have been generated for all members (block 360). For example, the member management system 220 may determine whether containment commands have been generated for all the members 210 in a team in a competitive environment that the member management system 220 manages. If, for example, containment commands have been generated (block 360—YES), process 300 may end, otherwise, at block 360-NO, the process 300 may return to block 315 in which containment commands may be generated for the next member 210 in the competitive environment.

As described herein, aspects of the present disclosure may include developing and executing a containment plan based on developing a set of containment options for containing the threat of opponents by members 210 in a competitive, noisy environment in which opponent behavior may be erratic, unclear, and/or deceptive. The process for developing containment options may include consolidating and stabilizing inputs in the noisy environment in which inputs may be based on deceptive and unpredictable opponent behavior. Knowledge of the underlying dynamics of cooperative member 210 movement and the impacts from the complexities of highly non-linear spaces with complex kinematics may improve containment effectiveness. Accordingly, aspects of the present disclosure may also centralize the coordination of member 210 movement and placement.

In some embodiments, containment strategy criteria may include a length of time the members 210 may contain opponents using the least amount of fuel. By implementing fuel consumption criteria, the member 210 are not hastily committed too early, thereby maintaining the highest number of members 210 and the most options to direct the members 210 in an encounter, thus mitigating the deceptive behavior of opponents.

In some embodiments, the containment approach, described herein, may factor in two aspects to opponent "containment" (e.g., "Look Containment" and "Reach Containment.") Look Containment may refer to the approach of maintaining the opponents in line-of-sight using field-of-view and range as look limitation parameters. Reach containment, however, involves bit ibky physical position containment, rather determining ability of the members 210 to reach the opponent within the members' 210 resources. The systems and/or methods, described herein, may execute calculations involving time to reach an opponent, fuel expenditure, and fuel margins when determining reachability.

Figure 4:
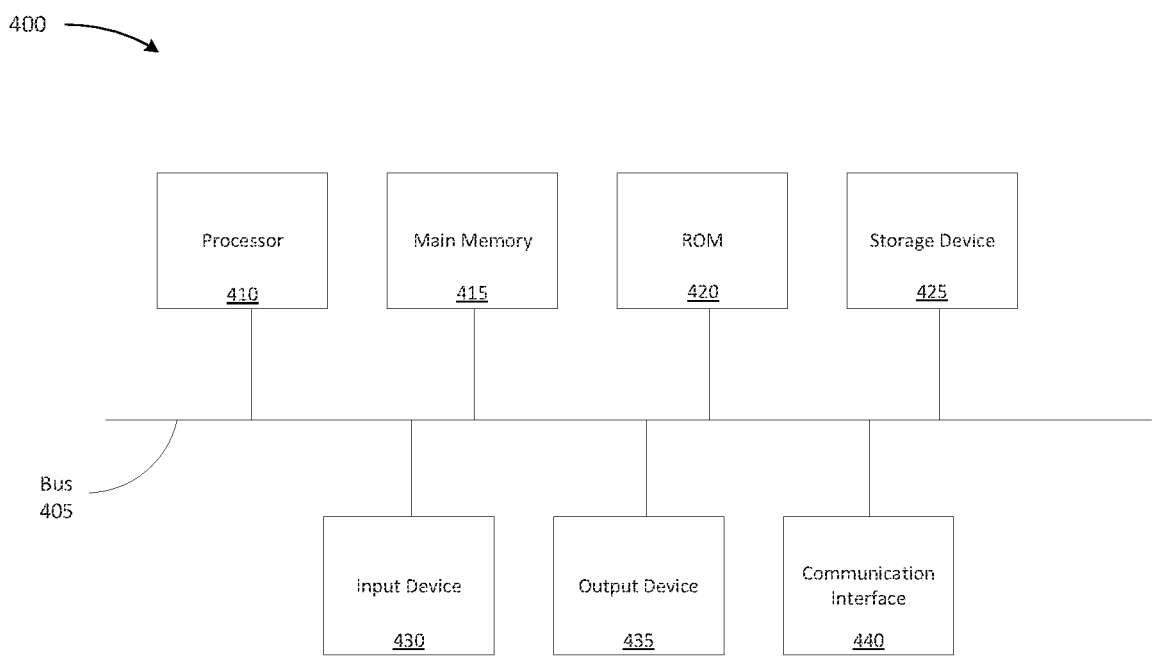
FIG. 4 illustrates example components of a device that may be used within environment of FIGS. 2A and 2B.

FIG. 4 illustrates example components of a device 400 that may be used within environment 200 of FIGS. 2A and 2B. Device 400 may correspond to the members 210, the sensors 215, and/or the member management system 220. Each of the members 210, the sensors 215, and/or the member management system 220 may include one or more devices 400 and/or one or more components of device 400.

As shown in FIG. 4, device 400 may include a bus 405, a processor 410, a main memory 415, a read only memory (ROM) 420, a storage device 425, an input device 430, an output device 435, and a communication interface 440.

Bus 405 may include a path that permits communication among the components of device 400. Processor 410 may include a processor, a microprocessor, an application specific integrated circuit (ASIC), a field programmable gate array (FPGA), or another type of processor that interprets and executes instructions. Main memory 415 may include a random access memory (RAM) or another type of dynamic storage device that stores information or instructions for execution by processor 410. ROM 420 may include a ROM device or another type of static storage device that stores static information or instructions for use by processor 410. Storage device 425 may include a magnetic storage medium, such as a hard disk drive, or a removable memory, such as a flash memory.

Input device 430 may include a component that permits an operator to input information to device 400, such as a control button, a keyboard, a keypad, or another type of input device. Output device 435 may include a component that outputs information to the operator, such as a light emitting diode (LED), a display, or another type of output device. Communication interface 440 may include any transceiver-like component that enables device 400 to communicate with other devices or networks. In some implementations, communication interface 440 may include a wireless interface, a wired interface, or a combination of a wireless interface and a wired interface. In embodiments, communication interface 440 may receiver computer readable program instructions from a network and may forward the computer readable program instructions for storage in a computer readable storage medium (e.g., storage device 425).

Device 400 may perform certain operations, as described in detail below. Device 400 may perform these operations in response to processor 410 executing software instructions contained in a computer-readable medium, such as main memory 415. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 415 from another computer-readable medium, such as storage device 425, or from another device via communication interface 440. The software instructions contained in main memory 415 may direct processor 410 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 400 may include additional components, fewer components, different components, or differently arranged components than are shown in FIG. 4.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects and/or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method for managing containment behavior of a member during an encounter in a competitive environment, the method comprising:
   receiving, by a computing device, input data relating to the encounter within the competitive environment;
   determining, by the computing device, a reachable opponent set identifying one or more opponents reachable by the member, wherein the member comprises a sensor system that is configured to detect the one or more opponents, and wherein the member, the one or more opponents, or both comprise an individual, a vehicle, or both;
   determining, by the computing device, containment boundaries for the member based on attributes of the member, the one or more opponents, or both, wherein the attributes comprise a type of the vehicle, a dimension of the vehicle, a capability of the vehicle, a function of the vehicle, a maneuverability of the vehicle, a fuel level in the vehicle, a fuel consumption in the vehicle, a health status of the vehicle, or a combination thereof;
   determining, by the computing device, one or more containment options based on the containment boundaries and the reachable opponent set;
   generating, by the computing device, a containment instruction based on a particular one of the one or more containment options; and
   outputting, by the computing device, the containment instruction to cause the member to move to a position identified in the particular one of the one or more containment options, wherein the member comprises a guidance system that is configured to guide a trajectory of the member toward the position in response to the containment instruction.

2. The method of claim 1, further comprising selecting the particular one of the one or more containment options based on at least one of:
   number of reachable opponents from a position defined by the particular one of the one or more containment options;
   spread times between the member and the reachable opponents;
   spread of fuel margin between the member and the reachable opponents;
   spread of reachability between the member and the reachable opponents; and
   measures of value of the reachable opponents.

3. The method of claim 1, further comprising determining a centroid of reachability for the one or more opponents in the reachable opponent set, wherein the determining the one or more containment options is based on the centroid of reachability.

4. The method of claim 1, further comprising preparing the input data and propagation of the input data to the next expected move update time prior to the determining the reachable opponent set, the preparing of the input data comprising of performing belief fusion of different beliefs of attributes, positions, predicted movements, or predicted intents of opponents.

5. The method of claim 1, further comprising ranking the one or more opponents based on respective measures of values of and select subset of opponents having measures of values satisfying a threshold.

6. The method of claim 1, further comprising generating containment instructions for additional members involved in the encounter.

7. A computer program product comprising a computer readable storage medium having program instructions embodied therewith, the program instructions executable by a computing device to cause the computing device to perform operations for managing containment behavior of a member during an encounter in a competitive environment, the operations comprising:
  receiving input data relating to the encounter within the competitive environment;
  determining a reachable opponent set identifying one or more opponents reachable by the member, wherein the member comprises a sensor system that is configured to detect the one or more opponents, and wherein the member, the one or more opponents, or both comprise an individual, a vehicle, or both;
  determining containment boundaries for the member involved in the encounter based on attributes of the member, the one or more opponents, or both, wherein the attributes comprise a type of the vehicle, a dimension of the vehicle, a capability of the vehicle, a function of the vehicle, a maneuverability of the vehicle, a fuel level in the vehicle, a fuel consumption in the vehicle, a health status of the vehicle, or a combination thereof;
  determining one or more containment options based on the containment boundaries and the reachable opponent set;
  generating a containment instruction based on a particular one of the one or more containment options; and
  outputting the containment instruction to cause the member to move to a position identified in the particular one of the one or more containment options, wherein the member comprises a guidance system that is configured to guide a trajectory of the member toward the position in response to the containment instruction.

8. The computer program product of claim 7, wherein the operations further comprise selecting the particular one of the one or more containment options based on at least one of:
  number of reachable opponents from a position defined by the particular one of the one or more containment options;
  spread times between the member and the reachable opponents;
  spread of fuel margin between the member and the reachable opponents;
  spread of reachability between the member and the reachable opponents; and
  measures of value of the reachable opponents.

9. The computer program product of claim 7, wherein the operations further comprise determining a centroid of reachability for the one or more opponents in the reachable opponent set, wherein the determining the one or more containment options is based on the centroid of reachability.

10. The computer program product of claim 7, wherein the operations further comprise preparing the input data prior to the determining the reachable opponent set, the preparing of the input data comprising of performing belief fusion of different beliefs of attributes, positions, predicted movements, or predicted intents of opponents.

11. The computer program product of claim 7, wherein the operations further comprise ranking the one or more opponents based on respective measures of values of and select subset of opponents having measures of values satisfying a threshold.

12. The computer program product of claim 7, wherein the operations further comprise generating containment instructions for additional members involved in the encounter.

13. A system comprising:
  a processor, a computer readable memory, a non-transitory computer readable storage medium associated with a computing device, and program instructions executable by the computing device to cause the computing device to perform operations for managing containment behavior of a member during an encounter in a competitive environment, the operations comprising:
    receiving input data relating to the encounter within the competitive environment;
    determining a reachable opponent set identifying one or more opponents reachable by the member, wherein the member comprises a sensor system that is configured to detect the one or more opponents, and wherein the member, the one or more opponents, or both comprise an individual, a vehicle, or both;
    determining containment boundaries for the member involved in the encounter based on attributes of the member, the one or more opponents, or both, wherein the attributes comprise a type of the vehicle, a dimension of the vehicle, a capability of the vehicle, a function of the vehicle, a maneuverability of the vehicle, a fuel level in the vehicle, a fuel consumption in the vehicle, a health status of the vehicle, or a combination thereof;
    determining one or more containment options based on the containment boundaries and the reachable opponent set;
    generating a containment instruction based on a particular one of the one or more containment options; and
    outputting the containment instruction to cause the member to move to a position identified in the particular one of the one or more containment options, wherein the member comprises a guidance system that is configured to guide a trajectory of the member toward the position in response to the containment instruction.

14. The system of claim 13, wherein the operations further comprise selecting the particular one of the one or more containment options based on at least one of:
  number of reachable opponents from a position defined by the particular one of the one or more containment options;
  spread times between the member and the reachable opponents;
  spread of fuel margin between the member and the reachable opponents;
  spread of reachability between the member and the reachable opponents; and
  measures of value of the reachable opponents.

15. The system of claim 13, wherein the operations further comprise determining a centroid of reachability for the one or more opponents in the reachable opponent set, wherein the determining the one or more containment options is based on the centroid of reachability.

16. The system of claim 13, wherein the operations further comprise preparing the input data prior to the determining the reachable opponent set, the preparing of the input data comprising of performing belief fusion of different beliefs of attributes, positions, predicted movements, or predicted intents of opponents.

17. The system of claim 13, wherein the operations further comprise ranking the one or more opponents based on respective measures of values of and select subset of opponents having measures of values satisfying a threshold.

* * * * *